(12) United States Patent
Ma et al.

(10) Patent No.: US 8,392,234 B2
(45) Date of Patent: Mar. 5, 2013

(54) DISTRIBUTED SOFTWARE PROJECT STAFFING AND SCHEDULING UTILIZING COMMUNICATION OVERHEAD COSTS

(75) Inventors: Qian Ma, Beijing (CN); Krishna Ratakonda, Yorktown Heights, NY (US); Nianjun Zhou, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 12/852,550

(22) Filed: Aug. 9, 2010

(65) Prior Publication Data

US 2012/0035972 A1  Feb. 9, 2012

(51) Int. Cl.
G06Q 10/00 (2012.01)
(52) U.S. Cl. ..................................... 705/7.13
(58) Field of Classification Search .................. 705/7.13
See application file for complete search history.

(56) References Cited

U.S. PATENT DOCUMENTS

| | | | | |
|---|---|---|---|---|
| 6,023,702 | A * | 2/2000 | Leisten et al. | 1/1 |
| 6,049,776 | A * | 4/2000 | Donnelly et al. | 705/7.14 |
| 6,237,915 | B1 * | 5/2001 | Ledet et al. | 273/236 |
| 6,571,215 | B1 * | 5/2003 | Mahapatro | 705/7.12 |
| 7,216,088 | B1 * | 5/2007 | Chappel et al. | 705/7.17 |
| 7,286,999 | B2 * | 10/2007 | Majd et al. | 705/7.15 |
| 7,512,659 | B2 * | 3/2009 | Keohane et al. | 709/206 |
| 7,836,103 | B2 * | 11/2010 | Li et al. | 707/809 |
| 7,860,810 | B2 * | 12/2010 | Raffo | 706/6 |
| 7,941,445 | B2 * | 5/2011 | Motoyama et al. | 707/790 |
| 7,971,180 | B2 * | 6/2011 | Kreamer et al. | 717/101 |
| 7,991,632 | B1 * | 8/2011 | Morris et al. | 705/7.11 |
| 8,006,223 | B2 * | 8/2011 | Boulineau et al. | 717/101 |
| 8,161,122 | B2 * | 4/2012 | Sood et al. | 709/206 |
| 2002/0052770 | A1 * | 5/2002 | Podrazhansky | 705/7 |
| 2002/0188597 | A1 * | 12/2002 | Kern et al. | 707/1 |
| 2008/0312980 | A1 * | 12/2008 | Boulineau et al. | 705/7 |
| 2009/0231339 | A1 * | 9/2009 | Smith et al. | 345/440 |

OTHER PUBLICATIONS

Douglas, Michael Jay, The impacts of the handoffs on software development: A cost estimation model University of South Florida, Scholar Commons, Jun. 1, 2006.*
Raffo, David et al., A Simulation Model for Global Software Development Project ProSim'05, 2005.*
Seaman, Carolyn B., Communication Costs in Code and Design Reviews: An Empirical Study Proceedings of CACON'96, Conference of the Centre for Advanced Studies on Collaborative Research, IBM, 1996.*
Espinosa, Alberto J. et al., The Impact of Time Separation on Coordination in Global Software Team: a Conceptual Foundation, Software Process Improvement Practice, vol. 8, 2003.*
Di Penta, Massimilian et al., The Effect of Communication Overhead on Software Maintanence Project Staffing: A Search Based Aproach; ICSM'07, IEEE International Conference on Software Maintanence, Oct. 2-5, 2007.*

(Continued)

Primary Examiner — Scott L Jarrett
(74) Attorney, Agent, or Firm — Ryan, Mason & Lewis, LLP

(57) ABSTRACT

Techniques for optimizing resource allocation are provided. The techniques include identifying one or more communication needs for each of one or more communications needed for execution of a project, identifying one or more members of each of the one or more communications and member information for each of the one or more members, using the one or more communication needs and member information to estimate one or more communication costs for each of the one or more communications needed for execution of the project, and comparing the one or more communication costs for each of the one or more communications to optimize resource allocation for executing the project.

19 Claims, 12 Drawing Sheets

OTHER PUBLICATIONS

Zhou, Nianjun et al., Quantitative Modeling of Communication Cost for Global Service Delivery IEEE International Conference on Services Computing, 2009.*

Bruegge, Bernd et al., Communication Metrics for Software Development ICSE'97, Proceedings of the 19$^{th}$ International Conference on Software Engineering, ACM, 1997.*

Gopal, Anadasivam et al., The Role of Software Processes and Communicaiton in Offshore Software Development Communications of the ACM, vol. 45, No. 4, 2002.*

Nayman, Laura et al., Collaborative Software Design & Development Spring 2008.*

Espinosa, Alberto J. et al., The Effect of Time Separation on Coordination Costs in Global Software Teams: A Dyad model Proceedings of the 37$^{th}$ Hawaii International Conference on System Sciences, 2004.*

Espinosa, Alberto J. et al., Modeling Coordination Costs Due to Time Separation in Global Software Teams Global Software Development Workshop, International Conference on Software Engineering (ICSE). IEEE, 2003.*

Hause, Martha L. et al., Team Performance Factors in Distributed Collaborative Software Development 13$^{th}$ Workshp of the Psychology of Programming Interest Group, Apr. 2001.*

Cataldo, Marcelo et al., Communication Patterns in Geographically Distributed Software Development and Engineers' Contribution to the Development Effort, CHASE'08, ACM 2008.*

Espinosa, Alberto J. et al., The Effect of Time Separation on Coordination Processes and Outcomes: A Case Study Proceedings of the 39$^{th}$ Hawaii International Conference on System Sciences, 2006.*

Malone, Thomas W. et al., Modeling the Performance of Organizational Structures Operations Research, Vo. 36, No. 3, May/Jun. 1988.*

Herbsleb James D. et al., An Empirical Study of Speend and Communication in Globally Distributed Software Development IEEE Transactions on Software Engineering, vol. 29, No. 6, Jun. 2003.*

Ye, Yunwen et al., Reducing the Cost of Communication and Coordination in Distributed Software Development SEAFOOD 2007.*

Fu, Yueyu et al., Discovery of Working Activities by Email Analysis Apr. 30, 2003.*

Cataldo, Marcelo et al., Communication Networks in Geographically Distributed Software Development CSCW'08, ACM, Nov. 8-12, 2008.*

Ramasubbu, Narayan et al., Modeling Coordination in Offshore Software Development Pacific Asia Conference on Information Systems, 2009.*

Tausworthe, R.C., Staffing Implications of Software Productivity Models TDA Progress Report, 42-72, Oct.-Dec. 1982.*

Brook's Law—definition Wikipedia.org, Retrieved May 2, 2012.*

Herbsleb, James D., Global Software Engineering: The Future of Socio-Technical Coordination IEEE, Future of Software Engineering, FOSE'07, 2007.*

Berenbach, Impact of Organizational Structure on Distributed Requirements Engineering Processes: Lesson Learned. In 1st International Workshop on Global Software Development for the Practitioner, 2006.

Erickson, J. M. and Evaristo, R. "Risk Factors in Distributed Projects" in 'Proc. 39th Annual Hawaii International Conference on System Sciences HICSS '06', 2006.

Gumm, D. C.: Distribution Dimensions in Software Development Projects: A Taxonomy. IEEE Software, vol. 23(5), pp. 45-51. IEEE Press, Los Alamitos (2006).

Herbsleb et al., An Empirical Study of Speed and Communication in Globally Distributed Software Development. IEEE Transactions on Software Engineering, vol. 29(6), pp. 481{494. IEEE Press, Los Alamitos (2003).

Herbsleb, Global Software Engineering: The Future of Socio-technical Coordination. In 29th International Conference on Software Engineering, 2007.

IBM Application Assembly Optimization Service Offering, http://www-935.ibm.com/services/us/gbs/bus/html/gbs-application-assembly-optimization.html.

IBM Rational Portfolio Manager (http://www-306.ibm.com/software/awdtools/portfolio/).

Jazz (https://jazz.net/pub/index.jsp.

Lindqvist et al., Distributed Development in an Intra-national, Intra-organizational Context: An Experience Report. In 1st International Workshop on Global Software Development for the Practitioner, 2006.

Microsoft Project (http://www.microsoft.com/project/en/us/default.aspx).

Sengupta et al., A Research Agenda for Distributed Software Development. In: 28th International Conference on Software Engineering, pp. 731-740. ACM Press, New York (2006).

Sinha, V., Sengupta, B., Chandra, S.: Enabling Collaboration in Distributed Requirement Management. IEEE Software, vol. 23(5), pp. 52-61. IEEE Press, Los Alamitos (2006).

Wiredu, A Framework for the Analysis of Coordination in Global Software Development. In 1st International Workshop on Global Software Development for the Practitioner, 2006.

Cataldo et al. "Communication patterns in geographically distributed software development and engineers' contributions to the development effort" in 'CHASE '08: Proceedings of the 2008 international workshop on Cooperative and human aspects of software engineering', ACM, New York, NY, USA, 2008, pp.

* cited by examiner

US 8,392,234 B2

DISTRIBUTED SOFTWARE PROJECT STAFFING AND SCHEDULING UTILIZING COMMUNICATION OVERHEAD COSTS

FIELD OF THE INVENTION

Embodiments of the invention generally relate to information technology (IT), and, more particularly, to optimizing resources allocation.

BACKGROUND OF THE INVENTION

Many software development and IT service projects are accomplished through global collaboration by IT companies to achieve cost reduction. But such techniques create challenges to the project management and project cost planning. Different from the traditional development at the same lab with open cubic allowing almost instant communication, such global operations create different development environments and cultures. Such change makes communication itself an issue. In addition, the different working hours of such global team members can also make communication a challenge.

SUMMARY OF THE INVENTION

Principles and embodiments of the invention provide techniques for optimizing resources allocation for global service delivery. An exemplary method (which may be computer-implemented) for optimizing resource allocation, according to one aspect of the invention, can include steps of identifying one or more communication needs for each of one or more communications needed for execution of a project, identifying one or more members of each of the one or more communications and member information for each of the one or more members, using the one or more communication needs and member information to estimate one or more communication costs for each of the one or more communications needed for execution of the project, and comparing the one or more communication costs for each of the one or more communications to optimize resource allocation for executing the project.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
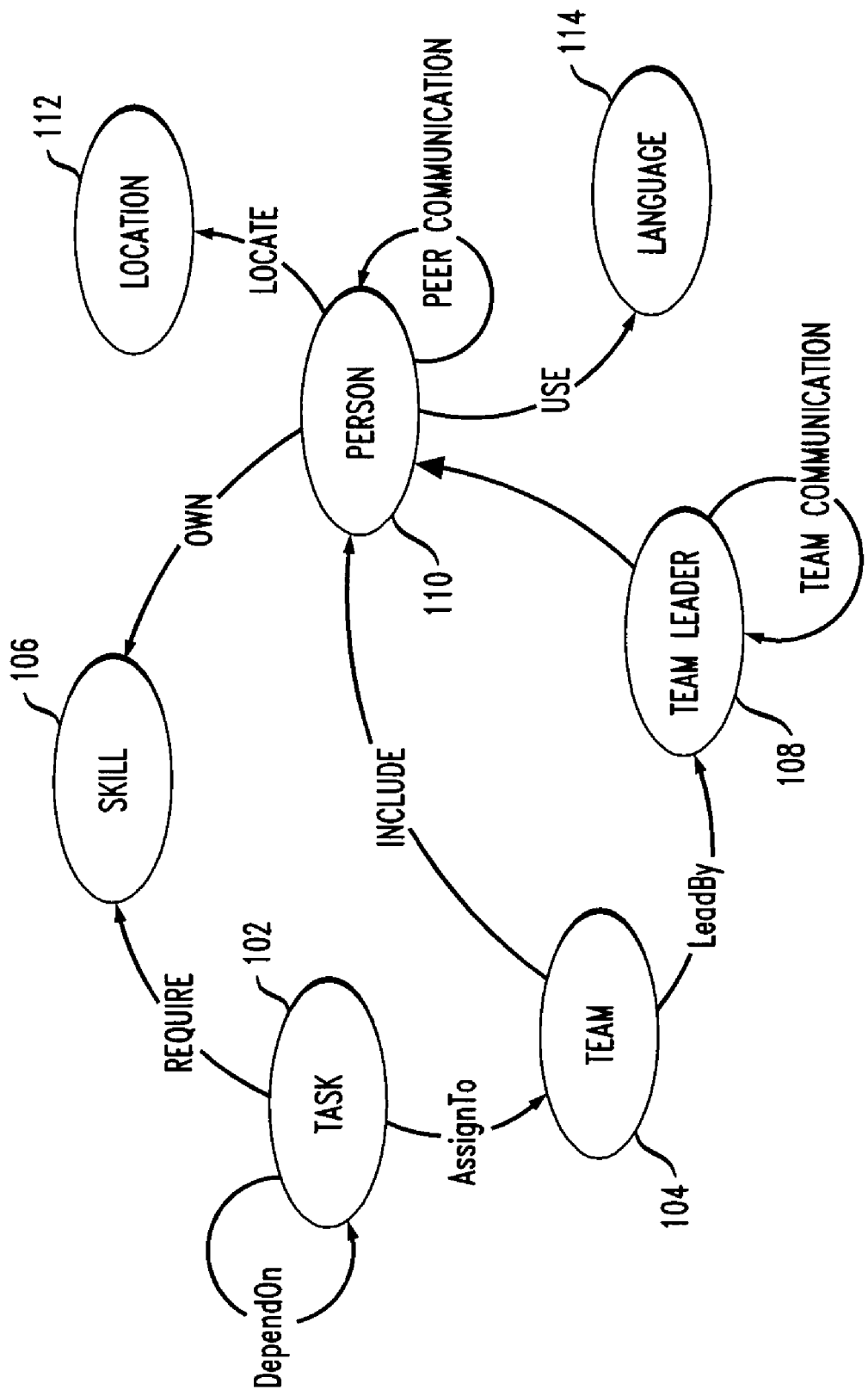
FIG. 1 is a diagram illustrating a meta-model example, according to an embodiment of the present invention.

Principles of the invention include optimizing resources allocation for global software development by measuring the communication cost. One or more embodiments of the invention, given a project plan and a set of resources, include estimating the cost and/or overhead of distributing an effort to a geographically distributed team versus a centrally located, homogeneous team.

Communication cost for a distributed team can include several dimensions, such as, for example, the following. Cost incurred due to the inherent nature of the project include the cost that even a homogeneous team would pay because of the need for communication to accomplish a set of tasks in geographically distributed locations. To reduce this cost might include doing a different grouping of tasks to minimize the level of interaction between distributed teams.

Cost incurred due to language, cultural, skill level and time zone differences includes costs that are incurred due to the heterogeneity of the distributed team. The same task groupings allocated to different teams can have different cost structures. Cost incurred due to process, method and tool variance includes using certain teams that may require using specific tools (such as, for example, transferring code to a different concurrent versions system (CVS) repository) or processes mandated by geography. These process variances create an increased overhead.

Accordingly, one or more embodiments of the invention include quantifying the increased overhead in leveraging distributed resources as one of a project's costs. This overhead cost measurement is associated with metrics that measure communication quality, such as reduction in productivity and communication delay. These metrics can, in turn, be computed as functions of underlying project parameters. To achieve this objective, one or more embodiments of the invention include building a project communication model (PCM) to categorize different types of collaborative communication. Also, communication efficiency and changes in resource availability can be represented in terms of information theoretic concepts such as, for example, reduced channel capacity, information encoding efficiency and channel availability. As such, one or more embodiments of the invention can be used to help determine the cost associated with team formation and task distribution during the project planning phase.

Communication cost can rely on how a global team is formed. There are many types of communication needs that exist in project collaboration, from, for example, peer communication for a technical solution, to architecture design for architects and decision making among the team lead. The structure of a global team will determine the communication needs, which in turn determine the communication expense in such an environment. Therefore, a tangible quantitative method of analyzing such cost would be an advantageous aspect of a global project plan.

One or more embodiments of the invention include techniques for predicting the communication cost in connection with global software development, as well as optimizing a team formation and task allocation to minimize such cost. Additionally, such optimization techniques can be used, by way of example, for future planning of a global project.

As further discussed herein, one or more embodiments of the invention include estimating communication cost via the following steps. The communication behaviors/types embedded in the team structure at the conceptual level are identified. One or more embodiments of the invention include using an ontology describing concepts involved in the project management such as, for example, task, team, skill, location, and resource as well as their necessary properties. Based on this ontology, a graphic meta-model is defined to capture the various relationships existing in the project structure, and the communication required to maintain such relationships. For example, the peer communication between two team members is used to maintain a peer relationship. The properties of each team member, such as the location, language and skill etc., are also associated to the peer relationship. These properties are also kept to calculate the communication cost.

Additionally, at the meta-model level, the cost formula is provided for each communication type in the meta-model. Each communication type is severed as a special communication need in project management, and those communications needs exist at the different project structure levels (peer or cross-team level). Depending on whether a team or a peer is in a remote location or not, the communication cost can be quantified as a function of the channel's efficiency and availability based on the team or peer properties. The cost formula may be deterministic or stochastic. For example, two people who speak fluent English may be more efficient than two persons having English as their second language, which may result in a longer communication if the working language is English. This can impact the efficiency of the task execution, which can results in a project getting delayed.

Also, for a specific project, one or more embodiments of the invention can include describing the team structure as an instance graph annotated by the meta-model. This instance graph can be the foundation of a quantitative analysis on the project communication cost. A series of sub-graphs can be extracted from the whole instance graph, wherein each sub-graph represents an atomic relationship in the project management that needs certain communication to maintain. Each sub-graph should contain the necessary property values, and because the communication type is quantified in the meta-model with mathematical formula, one or more embodiments of the invention can use the sub-graphs as the inputs to calculate corresponding results for this project. Subsequently, all of the sub-graphs can be summed to obtain the total communication cost for the project.

Further, a different formation of the team structure and resource allocation will result in an alternative project plan, which ends as a different instance graph. To attain the team structure and resource allocation optimization, one or more embodiments of the invention include calculating the cost for each alternative project plan and determining the lowest one. In addition, if the communications change in current project, the communication cost can also be recalculated to obtain their influence. All of the optimal solutions of team formation and task allocation can be formalized into rules for future use in other projects. Also, an optimal grouping (or rank-ordered list of groupings) can be provided for minimizing communication overhead.

One or more embodiments of the invention can include data monitoring. The frequency of communication between team can be identified through the repeatable calendar events or historical data. The duration of each meeting can be measured from the team leader's calendar. Also, the data of informal discussion can be determined, for example, from the questionnaires.

Additionally, in one or more embodiments of the invention, communication efficiency can be found through research, and channel capacity can be estimated through the percentage of information through body language (for example, face-to-face interactions), tone of speech (for example, phone interactions), the speed of talk (for example, phone interactions) and typing.

To overcome challenges of such quantification such as, for example, the complexity of the human interaction and using current project management systems to capture and model such interaction, one or more embodiments of the invention include using ontology to describe concepts in the project delivery. Based on the ontology, one or more embodiments of the invention can define a meta-model to connect the necessary elements involved in the global project planning. The connections are defined as the possible relationships. Also, the ontology and meta-model can be extended to include more factors needed to be considered for computing the communication cost.

FIG. 1 is a diagram illustrating a meta-model example, according to an embodiment of the present invention. By way of illustration, FIG. 1 depicts seven concepts of the ontology and existing relationships. A project has tasks. Each task 102 can be allocated to a remote (or global) team 104. There are dependencies among different tasks. If a dependency relationship exists between two tasks, it means that the two teams in charge of the two tasks must have a communication to complete their tasks. A team can include one or several persons 110, and one of them is the team leader 108. The team leader can have the responsibility of communicating with other teams. Each person has his properties, such as a skill 106 (for example, Java, C++, which could be matched to see whether it is required by the task), a location 112 (for example, China, US, India, etc.) and a language 114 (for example, English, Chinese, French, etc.). The property values are used for computing the communication cost.

At a meta-model level, one or more embodiments of the invention include associating certain communication categories to a relationship. Examples of the communication categories can include the following. With peer communication, a sub-part of the meta-model contains the task, the communication peers, their skills, locations, languages and other factors influencing the communication. A peer communication only exists in two members from the same team. With team communication, a sub-part of the meta-model contains the team leaders, the associated tasks and the skills, locations, languages of the team leaders.

Figure 2:
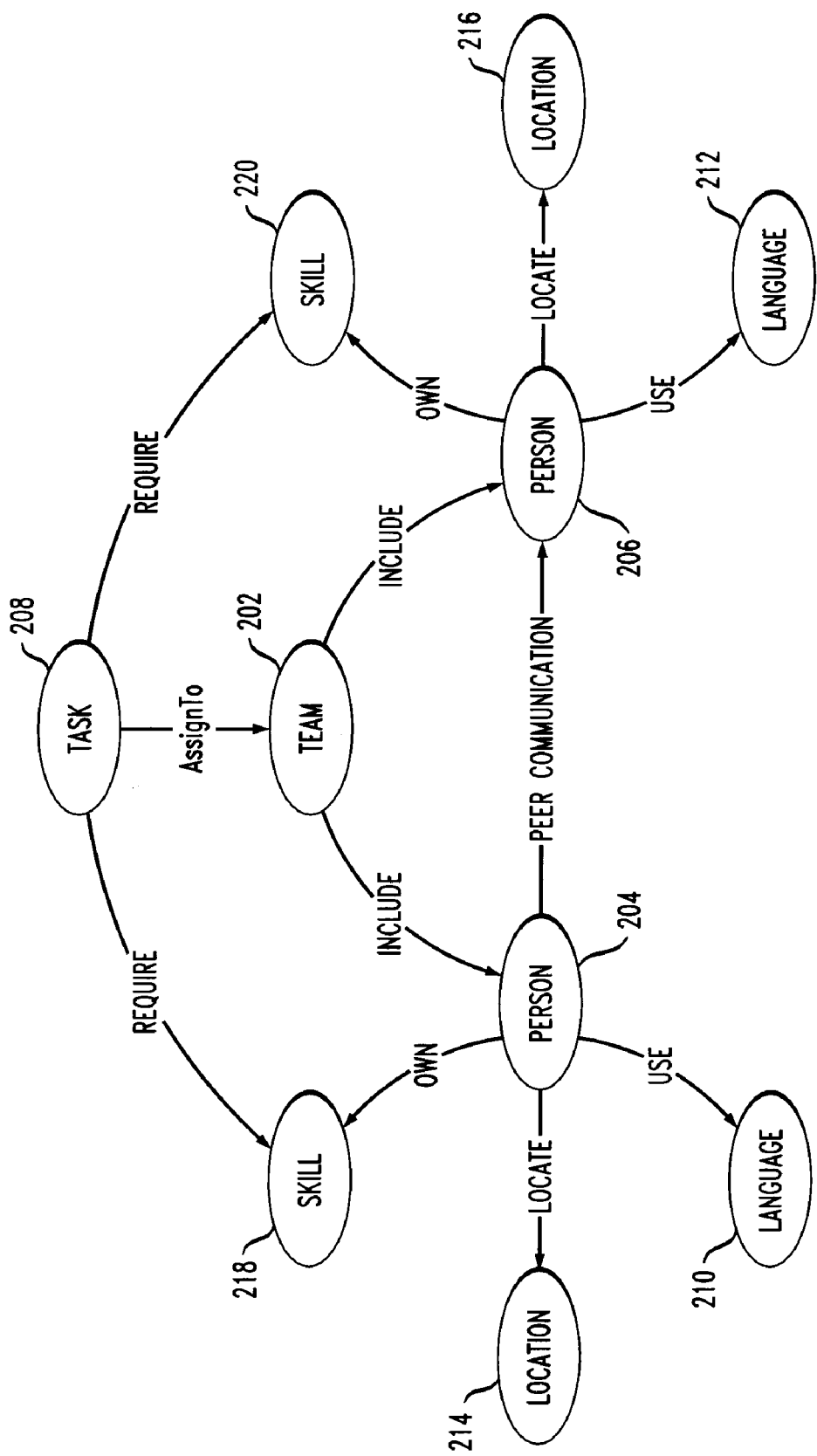
FIG. 2 is a diagram illustrating sub-parts of meta-model to represent a peer communication, according to an embodiment of the present invention.

FIG. 2 is a diagram illustrating sub-parts of meta-model to represent a peer communication, according to an embodiment of the present invention. A peer communication occurs when two people (for example, person 204 and person 206) belong to the same team 202. The two people can be communicating with each other, for example, because they are collaborating on a task 208 allocated to their team. As depicted in FIG. 2, the attributes of each person, such as, for example, location (214 and 216, and language (210 and 212) will impact the efficiency and availability of the communication. To finish the task requires some skill, and thus, the skill of the two (for example, 218 and 220) will also impact the efficiency of the communication. Accordingly, the attribute (property) values can be used for computing the communication cost.

Figure 3:
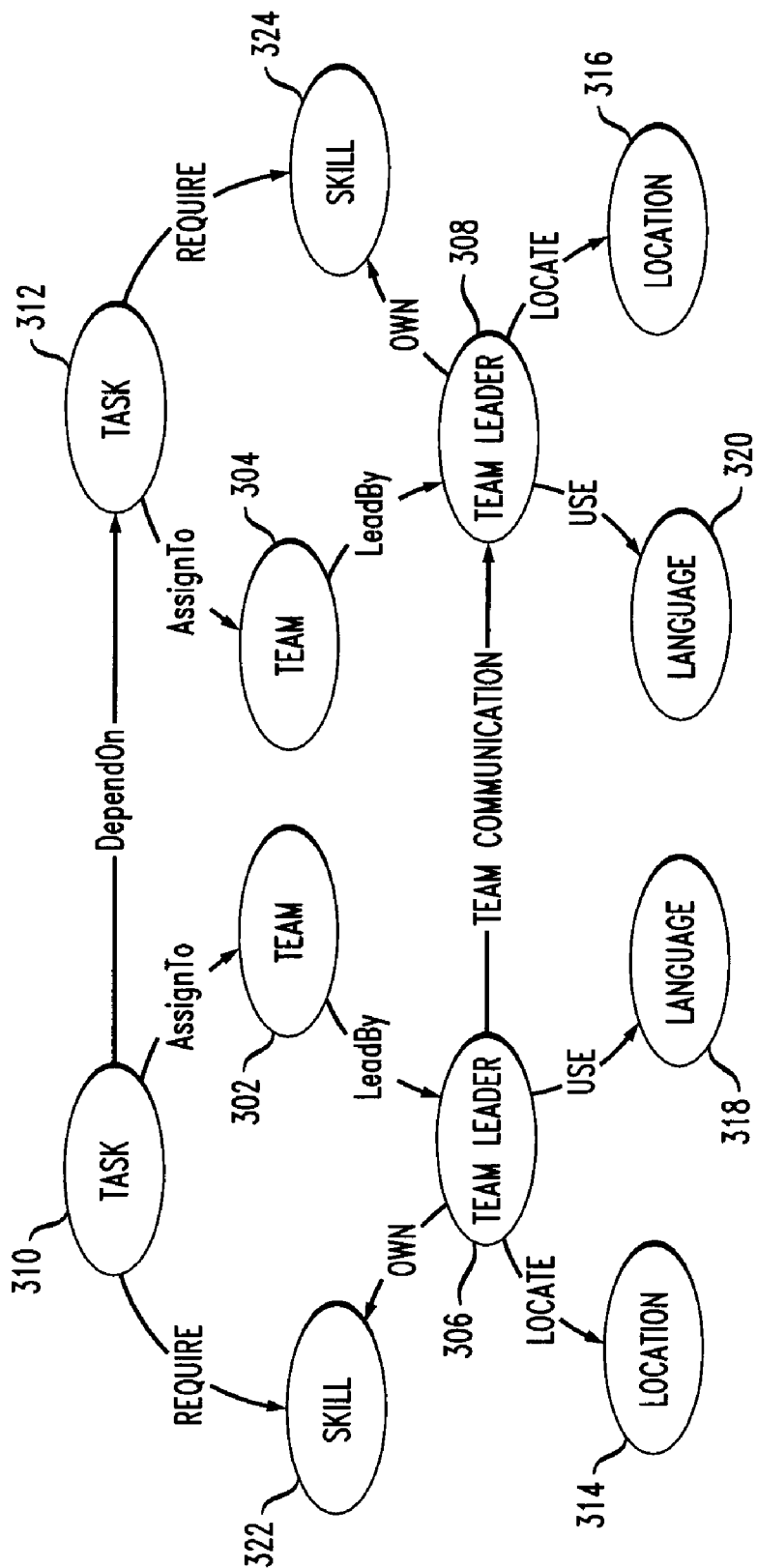
FIG. 3 is a diagram illustrating sub-parts of meta-model to represent a team communication, according to an embodiment of the present invention.

FIG. 3 is a diagram illustrating sub-parts of meta-model 302 to represent a team communication, according to an embodiment of the present invention. A team communication occurs between the leaders of two teams, for example, when two team leaders 306 and 308 communicate with each other because their teams (for example, team 302 and team 304) are handling two tasks 310 and 312 having dependency. The team leaders may also need, by way of example, to synchronize the status and perform some decision making during the work. The attributes (property) of each team leader, such as the location (314 and 316) and language (318 and 320), will impact the efficiency and availability of the communication. Also, to finish the task requires some skill, and thus, the skill (322 and 324) of the two team leaders will also impact the efficiency of the communication. As with the peer communication, the attribute (property) values can be used for computing the communication cost.

Besides the categories, one or more embodiments of the invention can also include identifying the communication purposes. Different purposes will affect the final calculation of the communication cost. Communication purposes can include, by way of example, the following. Communication for learning can include sharing the knowledge among persons, maybe including the context and document of the task and the development skill, etc. Communication for decision-making can indicate that people want to make an agreement on their work and their interfaces. Using such classification of purposes, the peer communication can be for learning and decision making, while the team communication is only for decision.

Communication overhead is defined herein as the time needed to exchange certain information (say I) for a communication session through a certain channel (for example, a telephone) with a group of participants (say m). Each team member contributes $I_i$. Then $$I = \sum_{i=1}^{m} I_i$$

The estimation of communication cost determines the cost in each category and each purpose. One or more embodiments of the invention can include applying the traditional communication theory for the estimation (that is, to estimate the communication between people). Each communication has a channel. The efficiency and availability of this channel will affect the communication cost. Using the peer communication for learning as an example, the best channel for two peers is that both of them have the skills required by the task and that they have a face-to-face meeting with the same working language. Assume the cost of this scenario as a base $C_b$, which can be calculated by the total amount of the information I dividing the transmitted information per time unit $I_u$. Also, in one or more embodiments of the invention, assume that I (and $I_i$) is a constant, because I usually depends on the size and complexity of the task(s) and exhibits less variation. Let $I_u$ denote the channel capacity ($I_u$) that is the maximum amount of information that can be transmitted per time unit. As such, the communication overhead (in time) is:

$$C_b = \frac{I}{I_u}$$

If one of the two peers does not have the required skill, it might be difficult for the other peer to communicate the information related to the skill. For example, if the task requires Java, it may take a longer time for a C++ developer to understand the information transmitted from a Java developer. In this situation, the unit transferred information will be reduced by a coefficient α (α<1). Therefore, if both peers would like to communicate half of the total information, the cost in this condition can be calculated as $C_s$:

$$C_l = 0.5\frac{I}{I_u} + 0.5\frac{I}{\alpha I_u} = 0.5 C_b + \frac{0.5}{\alpha} C_b = 0.5\left(1 + \frac{1}{\alpha}\right) C_b$$

Similarly, two people in the peer communication may prefer to use different working languages. For example, one may want to use English, but the other prefers to use Chinese. By way of example, assume that the peer preferring to use Chinese is just reasonably fluent in English, so the channel efficiency is lower than the base situation. The unit transferred information will be reduced by a coefficient β (β<1). Therefore, if both peers would like to communicate half of the total information, the cost in this condition can be calculated as $C_l$:

$$C_l = 0.5\frac{I}{I_u} + 0.5\frac{I}{\beta I_u} = 0.5 C_b + \frac{0.5}{\beta} C_b = 0.5\left(1 + \frac{1}{\beta}\right) C_b$$

In a global development environment, a remote communication channel, such as a telephone call, web conference or an instant message session, can become the replacement of a traditional face-to-face meeting. This communication channel change can reduce the communication capacity. For example, the information from body language cannot be exchanged through a telephone call. Accordingly, one or more embodiments of the invention include using a parameter α to reflect such channel capacity reduction.

The encoding efficiency is defined herein as the ability of an individual participant (i-th) to use a communication channel to transmit his/her information to other participants. The default value of an encoding efficiency is 1. In a global development environment, there are multiple factors that can affect the encoding efficiency of a participant, such as the language barrier, the lack of domain knowledge or required skills as described herein. In one or more embodiments of the invention, assume that each factor can be represented with a positive value between 0 and 1. If more than one factor exists for a participant for the encoding efficiency in a communication session, the overall impact can be accumulated as a coefficient $\omega_i \leq 1$ as a product of these factors. Further, if it is assumed that each participant still wants to exchange the same information amount ($I_i$), the communication overhead $C_g$ is increased to:

$$C_g = \frac{1}{\alpha}\sum_{i=1}^{m}\frac{I_i}{\omega_i I_u} = \frac{1}{\alpha}\left(\sum_{i=1}^{m}\frac{\xi_i}{\omega_i}\right)\frac{I}{I_u} = \frac{1}{\alpha}\left(\sum_{i=1}^{m}\frac{\xi_i}{\omega_i}\right)C_b = \lambda C_b,$$

where $\xi_i = I_i/I$ is the percentage of information contributed by the participant i. $\lambda$ is the combined cost factor and expressed as:

$$\lambda = \frac{1}{\alpha}\left(\sum_{i=1}^{m}\frac{\xi_i}{\omega_i}\right) \geq 1$$

Using the analysis result of an individual session, one or more embodiments of the invention can estimate the overall communication overhead. For a given communication bundle (say j), the occurrence (repeat time) can be computed as:

$$\rho(j) = \frac{S(j)}{P(j)} = \frac{D_e(j) - D_s(j)}{P(j)},$$

where $D_s(j)$ and $D_e(j)$ are the start and finish dates of the communication bundle, $P(j)$ is the communication frequency (daily, weekly or monthly), and $p(j)$ is the number of individual sessions in the communication bundle. Assume that each session is identical in the bundle. Additionally, let m(j) denote the number of participants, and let $C_b(j)$ denote the baseline overhead. If there are a total of l individual communication bundles from a project, the overall communication overhead in global development environment is estimated as:

$$C_g = \sum_{j=1}^{l}\rho(j)m(j)\lambda(j)C_b(j),$$

and the total overhead C in a baseline situation (that is, co-located team) is:

$$C_b = \sum_{j=1}^{l}\rho(j)m(j)C_b(j)$$

Another factor influencing the communication is the location. Assuming that two people are not in the same city of a country, they likely cannot have a face-to-face discussion. The channel efficiency is also decreased because the body language disappears. The unit transferred information has a discount by a coefficient $\gamma$ ($\gamma < 1$). Therefore, comparing with the base situation, one or more embodiments of the invention can obtain the communication cost in this condition as $C_p$:

$$C_p = \frac{I}{\gamma I_u} = \frac{1}{\gamma}C_b$$

Another situation can include the two peers staying at different countries, or in general, different time zones. They may not have completely overlapping working times, and so it will affect the availability of the communication. For example, assume that two peers want to communicate with each other for one hour everyday. Supposing the overlap time for the two peers is q hours per day, one or more embodiments of the invention can include calculating the possibility p of obtaining this communication every day. If the idle ratio of a person per day is r, it can be inferred that p is:

$$p = 1 - (1-r^2)^q$$

If the two peers do not work in different time zones, they will get the maximal overlap working time. As such, assume that the maximal time is $q_0$, and it can be inferred that the possibility $p_0$ of a communication in this situation would be:

$$p_0 = 1 - (1-r^2)^{q_0}$$

Compared with a stable communication, the availability p to obtain the communication can likely delay the project schedule. The specific delay is dependent on the frequency f of the communication. If the communication needs to happen daily, the delay will be more serious than if happening weekly. Accordingly, one or more embodiments of the invention can include estimating the coefficient $\lambda$ ($\lambda > 1$) of additional delay as follows:

$$\gamma = \frac{\left(1 + \left(\frac{1}{p} - 1\right)f\right)}{\left(1 + \left(\frac{1}{p_0} - 1\right)f\right)} = \frac{p_0(p + (1-p)f)}{p(p_0 + (1-p_0)f)}$$

Further, one or more embodiments of the invention can include determining the overhead of communication when two peers stay in different time zones. This analysis has an additional cost than $C_p$, defined as $C_t$:

$$C_t = \lambda C_p = \frac{\lambda}{\gamma}C_b.$$

Additionally, the longer the time required for having an effective meeting, the lesser the chance of the meeting being scheduled in a timely fashion in scenarios involving a small overlap in participant time zones. For example, let m be the number of the participants for a planned meeting (communication session), n the number of time slots overlapping for all the participants, and k the number of time slots needed for the meeting. Furthermore, if the probability of a participant available for a given time slot is r, the probability that all the participants are available for the time slot is $r^m$. Based on these parameters, one or more embodiments of the invention can calculate the probability p to successfully have such a meeting for a given day.

By way of example, consider two different cases. In the first case, it is not required that k time slots being adjacent. The probability of having i available time slots for all the participants conforms to the binomial distribution. p is the sum of the probabilities when the number of available time slots (for all the participants) is larger or equal to k:

$$p = \sum_{i=k}^{n} \frac{n!}{(n-i)!(i!)} (r^m)^i (1-r^m)^{n-i}$$

In the second case, the time slots are required to be adjacent together to have a consecutive meeting. A recursive method can be used to calculate the probability p. Let q(i, n) be the probability that consecutive k time slots are available starting at time slot i. Then p can be calculated as the sum of q(i, n) from i=1 to (n−k+1). p is a function of k and n.

$$p = f(k, n) = \sum_{i=1}^{n-k+1} q(i, n)$$

The calculations of f(k,n) and q(i,n) are deduced as follows. q(i,n) is a probability of the following three events: 1) the (i−1)-th time slot is not available for the meeting (otherwise, the meeting can start from (i−1)-th time slot). The probability for this condition is $(1-r^m)$; 2) such a meeting cannot be arranged at the beginning (i−2) time slots, because q(i, n) is the probability that consecutive k time slots are available starting from time slot i. The probability for this event is [1−f(k,i−2)]; 3) from the i-th time slot, there are consecutive k available time slots for all the participants. The probability for this condition is $r^{mk}$. Therefore, q(i,n) can be solved recursively using following equation:

$$q(i,n)=(1-f(k,i-2))(1-r^m)r^{mk}(i \geq 2)$$

Finally, the components discussed above can be synthesized to obtain a complete formula for calculating p recursively:

$$p = f(k, n) = \begin{cases} 0 & (k > n) \\ r^{mk} & (k = n) \\ r^{mk} + \sum_{i=2}^{n-k+1} (1 - f(k, i-2))(1-r^m)r^{mk} & (k \leq n-1) \end{cases}$$

The availability reduction in a global or distributed development environment may defer a required meeting. For example, if a distributed team cannot find a time to communicate today, they may have to postpone it to tomorrow or even the day after tomorrow. Consequently, the number of days to complete a meeting conforms to a geometric probability distribution with mathematical expectation 1/p. The delay (in days) will be:

$$d = \frac{1}{p} - 1 = \frac{1-p}{p}$$

To have a comprehensive picture of the communication delay in a global development environment, the communication delay of asynchronous communication (that is, e-mail) among the members of a project is also examined. By way of example, assume that there is a time zone difference (say c) of two team members (say A and B). The time zone of A is earlier than B (that is, the work hours of A are earlier than B). Further, assume that an e-mail can be sent at any time of working hour with equal opportunity, and the number of work hours (say h hours) for all of the team members is the same. Also assume that the recipient of an e-mail reads and returns (if there is a need) the e-mail immediately, and the delivery time from one e-mail server to another server is ignored. One or more embodiments of the invention include using Ah (in hour) as the average delay of an e-mail message.

By way of example, consider two cases. The first case is that there is no overlap in the working hours of A and B. The delay for an e-mail sent by A is:

$$\Delta h = c - \frac{h}{2}$$

The delay for an e-mail sent by B is:

$$\Delta h = 24 - c - \frac{h}{2}$$

The second case is that there is an overlap (o) of working hours. The delay for the e-mail sent by A is:

$$\Delta h = \frac{(h-o)^2}{2h}$$

The delay for an e-mail response by B is:

$$\Delta h = \frac{h-o}{2h}(48 - 3h + o)$$

The change of communication overhead in a global development environment ($C_g$) can be viewed from a baseline situation ($C_b$) as the collaboration cost, which is $$\Delta C = C_g - C_b.$$

Here $C_g$ and $C_b$ can be estimated using techniques described herein. If a communication session keeps its communication time the same in a global development environment as its localized equivalent, it will be challenging for all of the team members to exchange the same amount of information due to communication efficiency reduction. The impact of inadequate communication can be quantified using this ratio of baseline communication time and required communication time:

$$\mu = \frac{C_b}{C_g} = \alpha \bigg/ \left( \sum_{i=1}^{m} \frac{\xi_i}{\omega_i} \right)$$

Let l be the number of participants with a preferred language that is not the working language. Additionally, assume that all of the participants want to have the same amount of information to be shared ($I_i$ is the same for all the participants). Accordingly, $$\mu = \frac{C_b}{C_g} = \frac{\alpha \omega m}{(m-l)\omega + l}$$

The probability of having a successful meeting can rely on the overlap time slots (n), the number of participants (m), and the value of r. The higher the values n and r are, the less likely it is that a delay happens. On the other hand, the higher the value m is, the more likely it is that a delay happens.

A baseline can also be defined as the situation wherein all participants are located in the same time zone to analyze the impact of the communication delay in a global development environment. The participants have the maximum time slot overlap (say $n_0$) in the baseline situation. One or more embodiments of the invention can calculate the probability having a meeting $p_0$ and corresponding delay $d_0$ for this baseline situation. The difference between $d_p$ and $d_{p_0}$ is the extra communication delay in a global project due to time zone difference:

$$\Delta d = d_p - d_{p_0} = \frac{1-p}{p} - \frac{1-p_0}{p_0}$$

The impact of a delay ($\Delta d$) also depends on the urgency of a meeting (communication session), which is represented by the frequency (such as daily, weekly or monthly) or interval (P) of a communication bundle. This impact can be presented as:

$$\delta = \frac{\Delta d}{P}$$

One or more embodiments of the invention can also consider the cost of the team communication and the communication for decision making. One variation one the techniques described above can include the amount of information needed to be transferred. Given that peer communication just relates to the task assigned to the team, the team communication may discuss information about two sequential tasks. Therefore, if the total amount of the information in the peer communication is I, one or more embodiments of the invention can estimate that the team communication has information 2I.

Based on the calculation of each sub-part of a meta-model, one or more embodiments of the invention can include summing each such calculation to obtain the cost of total communications in a project. Using $C_i$ to denote the cost of the sub-part i and totally s sub-parts, the cost of total communications is:

$$C = \sum_{i=1}^{s} C_i$$

Figure 4:
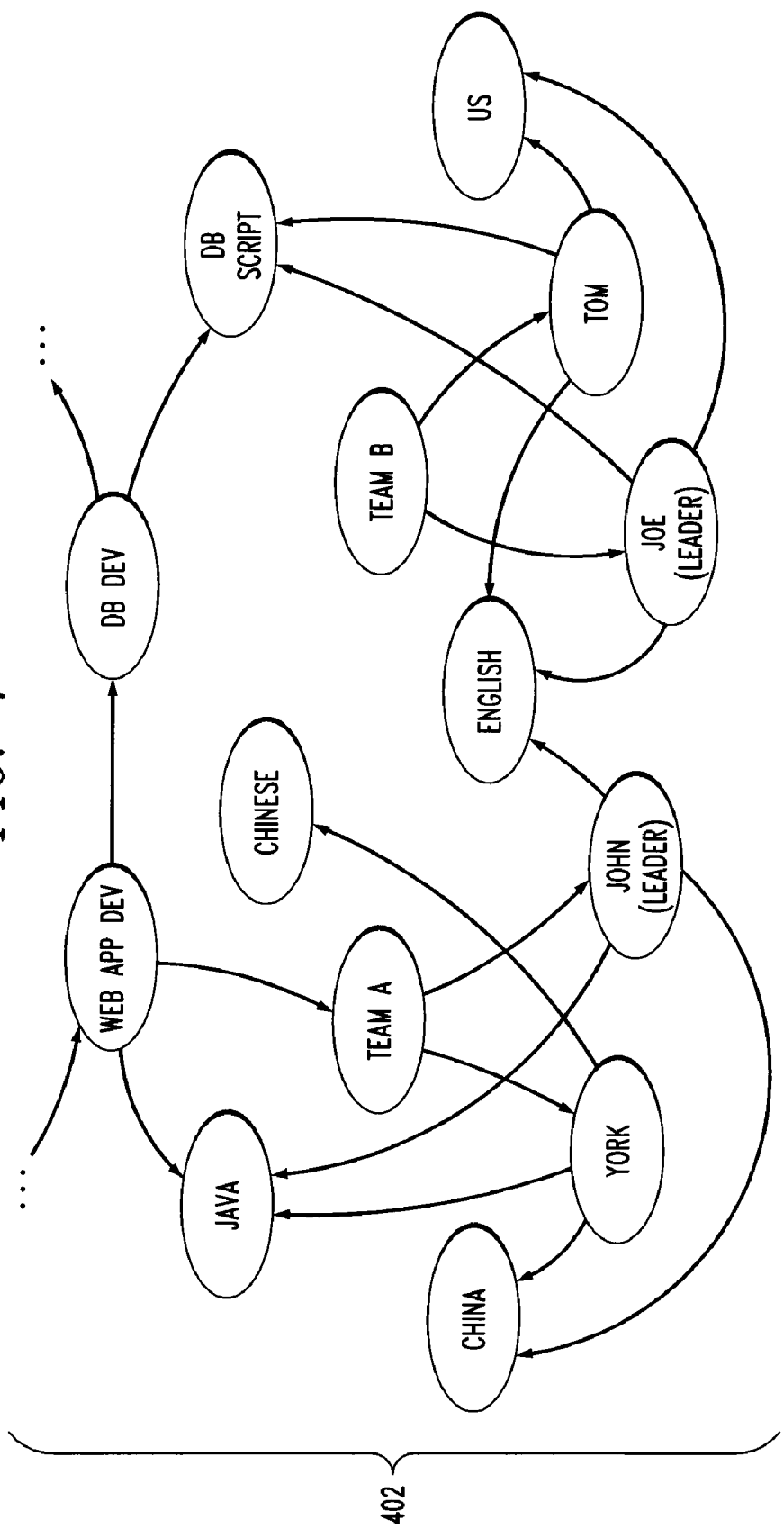
FIG. 4 is a diagram illustrating an instance graph of an example project based on a meta-model, according to an embodiment of the present invention.

How the above cost estimation is applied can be illustrated via the use of an example. As such, FIG. 4 is a diagram illustrating an instance graph 402 of an example project based on a meta-model, according to an embodiment of the present invention. In the project, there are two sequential tasks, web application development and database development. The former task is assigned to a team A, which has two persons, John and York. John is the team leader. Both John and York have the Java skill required by the web application development. They are located in China. John would like to use English as the working language, while York prefers to use Chinese. The latter task is assigned to a team B, which includes Joe and Tom. Joe is the team leader. Both Joe and Tom have the required DB Script skill. They are working in US and prefer to use English.

Figure 5:
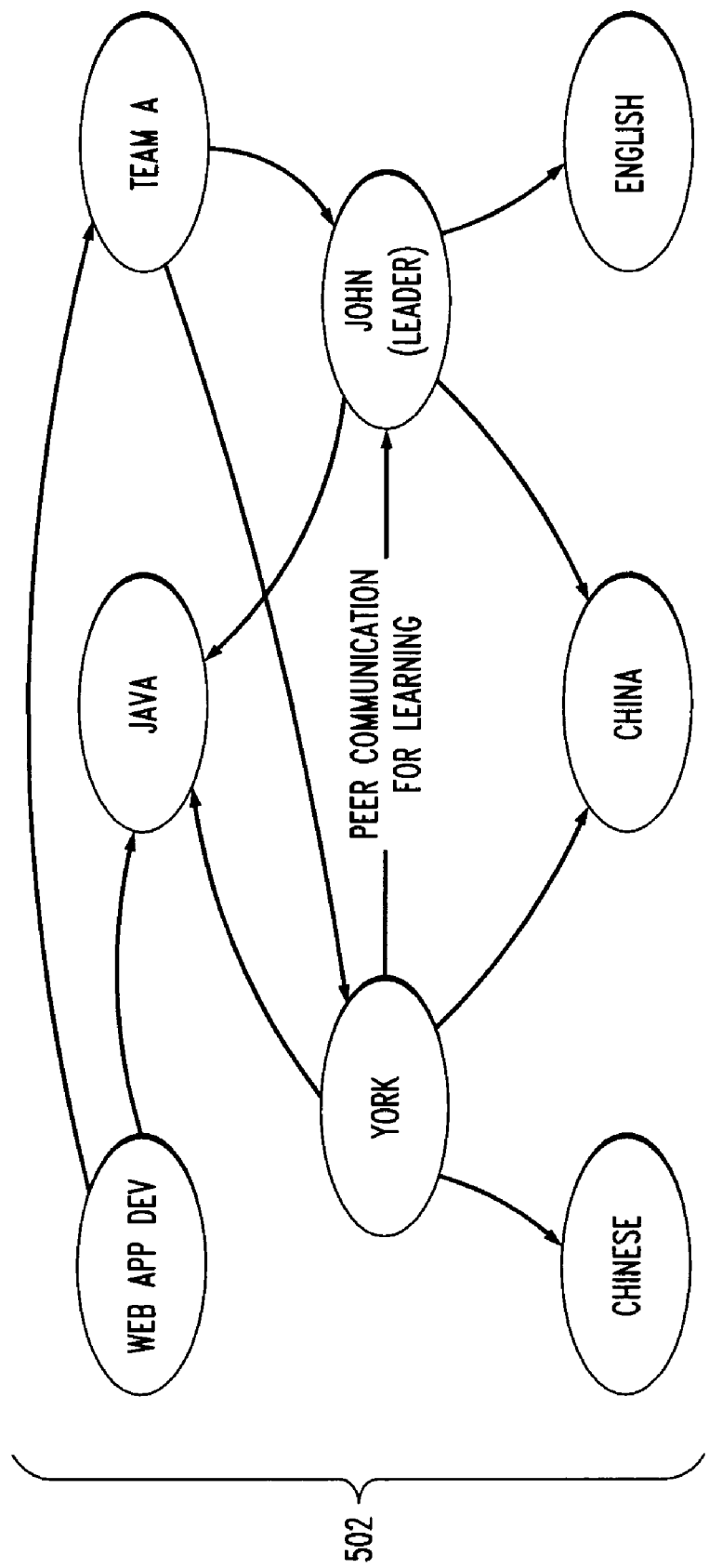
FIG. 5 is a diagram illustrating example peer communication, according to an embodiment of the present invention.

One or more embodiments of the invention can include extracting the sub-graphs from the project instance graph. Each sub-graph represents a communication based on the corresponding sub-part of meta-model. As an example, the peer communication for learning between John and York is illustrated in FIG. 5 via graph 502. Assume that John and York must have a one hour communication everyday. However, because they are using different working languages, so if $\alpha=0.8$, the communication will last:

$$C_l = 0.5\left(1 + \frac{1}{\beta}\right)C_b = 0.5\left(1 + \frac{1}{0.8}\right)*1 = 1.125$$

After quantitatively assessing the communication cost in the project, one or more embodiments of the invention can also determine the optimal team formation and task allocation (that is, determining the lowest communication cost). Typically, each modification to the team structure can be represented as an alternative project instance graph. The communication cost can be re-calculated based on the alternative graph. Comparing all of the calculations, the most desirable one can be determined. For example, one instance can include moving John to the US, as illustrated in the FIG. 6.

Figure 6:
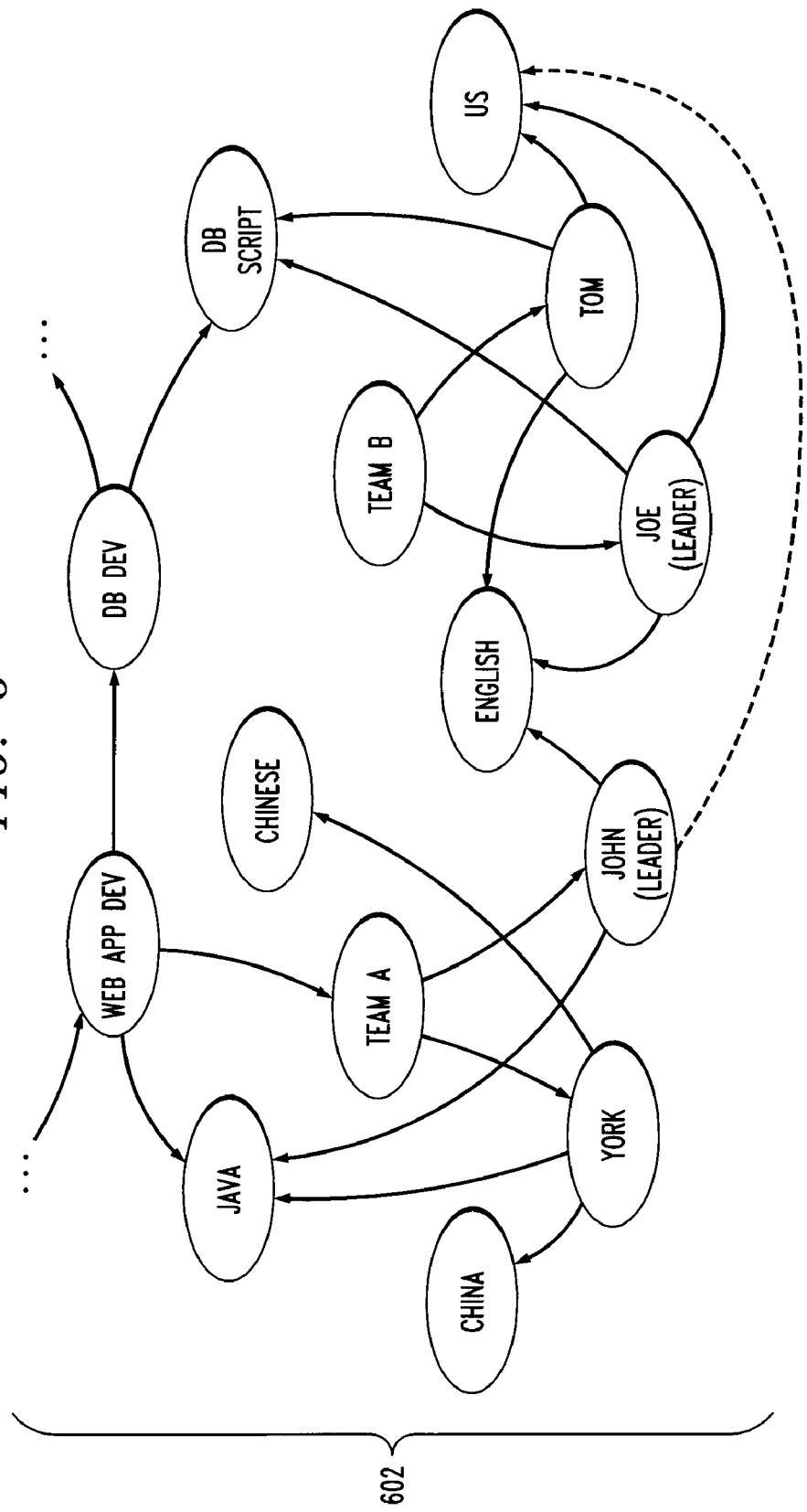
FIG. 6 is a diagram illustrating an alternative instance graph of an example project, according to an embodiment of the present invention.

FIG. 6 is a diagram illustrating an alternative instance graph 602 of an example project, according to an embodiment of the present invention. The move will affect the peer communication between John and York. Assume that John and York can find 8 hours of overlap everyday when they are in China, but now can only get 3 hours everyday. They still need to talk 1 hour everyday as before, and the idle ratio is 0.5. The influence of losing face-to-face discussion is 0.7. Thus, the new cost between these two peers is:

$$C = C_t C_l = \frac{\lambda}{\gamma}\left(0.5\left(1 + \frac{1}{\beta}\right)\right)C_b = 2.502$$

The communication between John and York is more difficult now since they are in the different time zone, and the recalculation result also reflects this. However, the team communication becomes easier because the two team leaders are in the same location. Therefore, it depends on the final combining result to see whether the modified team structure is a more desirable choice. When all of the possible graphs of the team structure and resource allocation are assessed, an optimal solution can be obtained.

Additionally, any previous experiences on the optimization of team structure and resource allocation can be documented as knowledge for future usage. For example, the communication can be highly related to the communication frequency. If the team communication between John and Joe happen frequently, John may need to be allocated to the US. Otherwise, keeping John in China may facilitate his peer communication with York.

Figure 7:
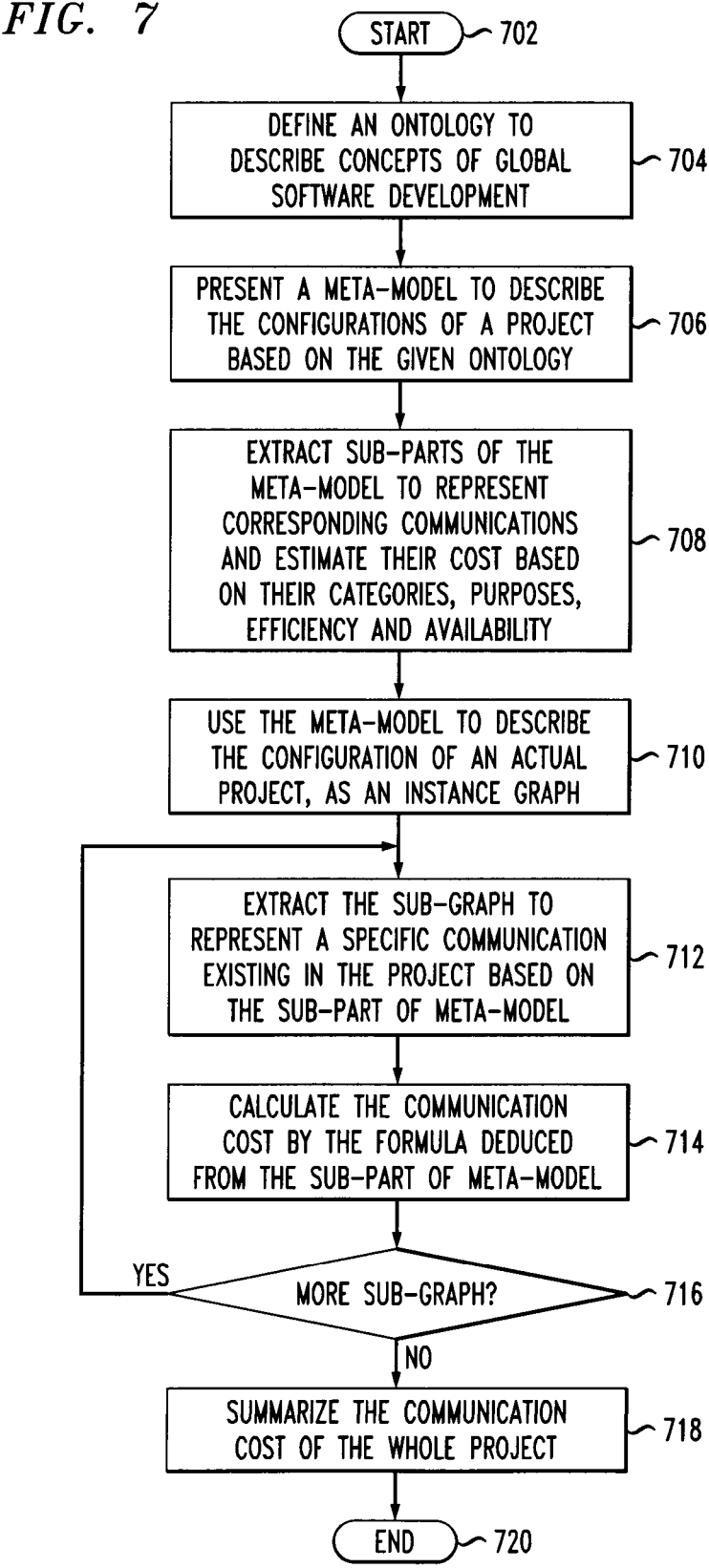
FIG. 7 is a flow diagram illustrating techniques for quantitatively analyze the communication cost, according to an embodiment of the present invention.

FIG. 7 is a flow diagram illustrating techniques for quantitatively analyze the communication cost, according to an embodiment of the present invention. By way of illustration, FIG. 7 depicts steps for performing an estimation of the communication cost and identifying the optimization for project management. Step 702 includes starting the process. Step 704 includes defining an ontology to describe concepts of global software development. Step 706 includes presenting a meta-model to describe the configurations of a project based on the given ontology.

Step 708 includes extracting sub-parts of the meta-model to represent corresponding communications and estimating their costs based on their categories, purposes, efficiency and availability. Step 710 includes using the meta-model to describe the configuration of an actual project as an instance graph. Step 712 includes extracting the sub-graph to represent a specific communication existing in the project based on the sub-part of the meta-model. Step 714 includes calculating the communication cost by the formula deduced from the sub-part of the metal-model. Step 716 includes determining if there are more sub-graphs. If yes, return to step 712. If no, proceed to step 718, which includes summarizing the communication costs of the whole project. Step 720 includes ending the process.

FIG. 7 depicts techniques that utilize the meta-level of communication cost formula. The benchmark input and parameters related to global collaboration can come, for example, from the inputs of project managers and/or from the historical data accumulated through various researches.

Figure 8:
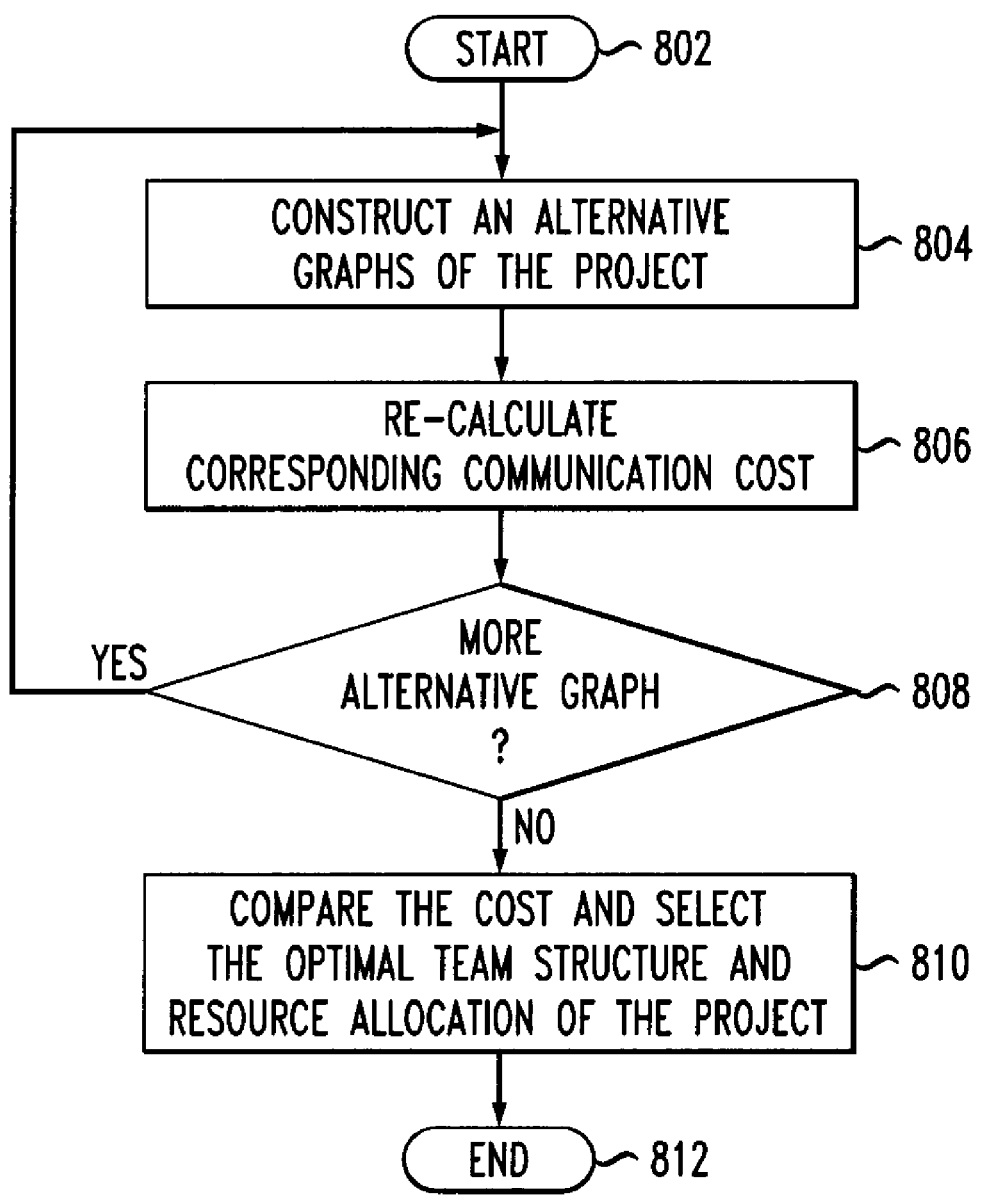
FIG. 8 is a flow diagram illustrating techniques for performing a cost optimization via team formation using attribute values related to global collaboration such as language, skills, locations and time zone, according to an embodiment of the present invention.

FIG. 8 is a flow diagram illustrating techniques for performing a cost optimization via team formation using attribute values related to global collaboration such as language, skills, locations and time zone, according to an embodiment of the present invention. Step 802 includes starting the process. Step 804 includes constructing alternate graphs of the project. Step 806 includes re-calculating corresponding communication costs. Step 808 includes determining if there is a need for additional alternative graphs. If yes, return to step 804. If no, proceed to step 810 which includes comparing the cost and selecting the optimal team structure and resource allocation for the project. Step 812 includes ending the process.

Figure 9:
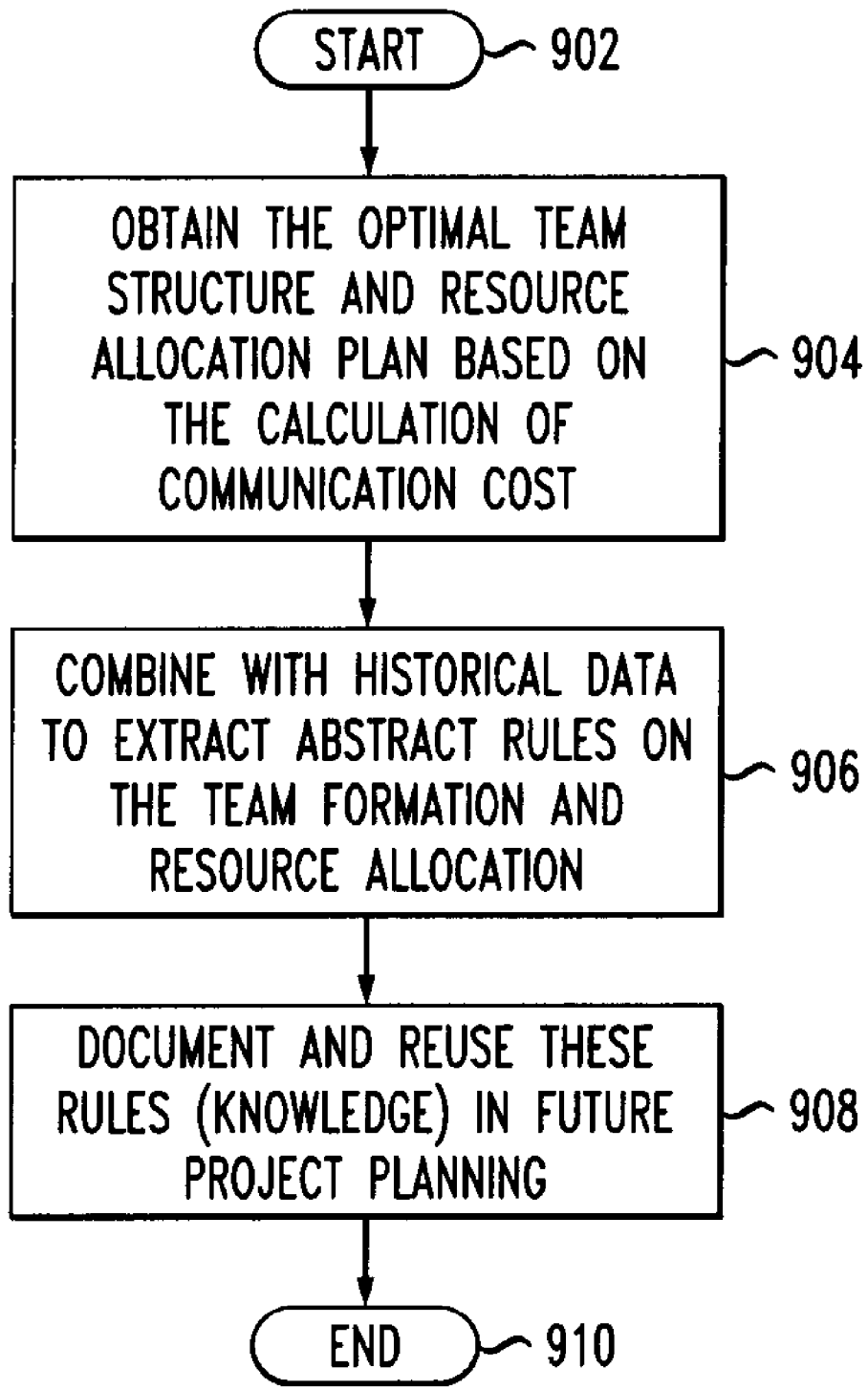
FIG. 9 is a flow diagram illustrating techniques for accumulating knowledge for future use, according to an embodiment of the present invention.

FIG. 9 is a flow diagram illustrating techniques for accumulating knowledge for future use, according to an embodiment of the present invention. Step 902 includes starting the process. Step 904 includes obtaining the optimal team structure and resource allocation plan based on the calculation of communication cost. Step 906 includes combining that information with historical data to extract abstract rules on team formation and resource allocation. By way example, if historical data indicated that two resources successfully communicated many times in the past in connection with different projects, the communication barrier between the two resources can be reduced in future projects. Step 908 includes documenting and reusing these rules (knowledge) in future project planning. Step 910 includes ending the process.

Figure 10:
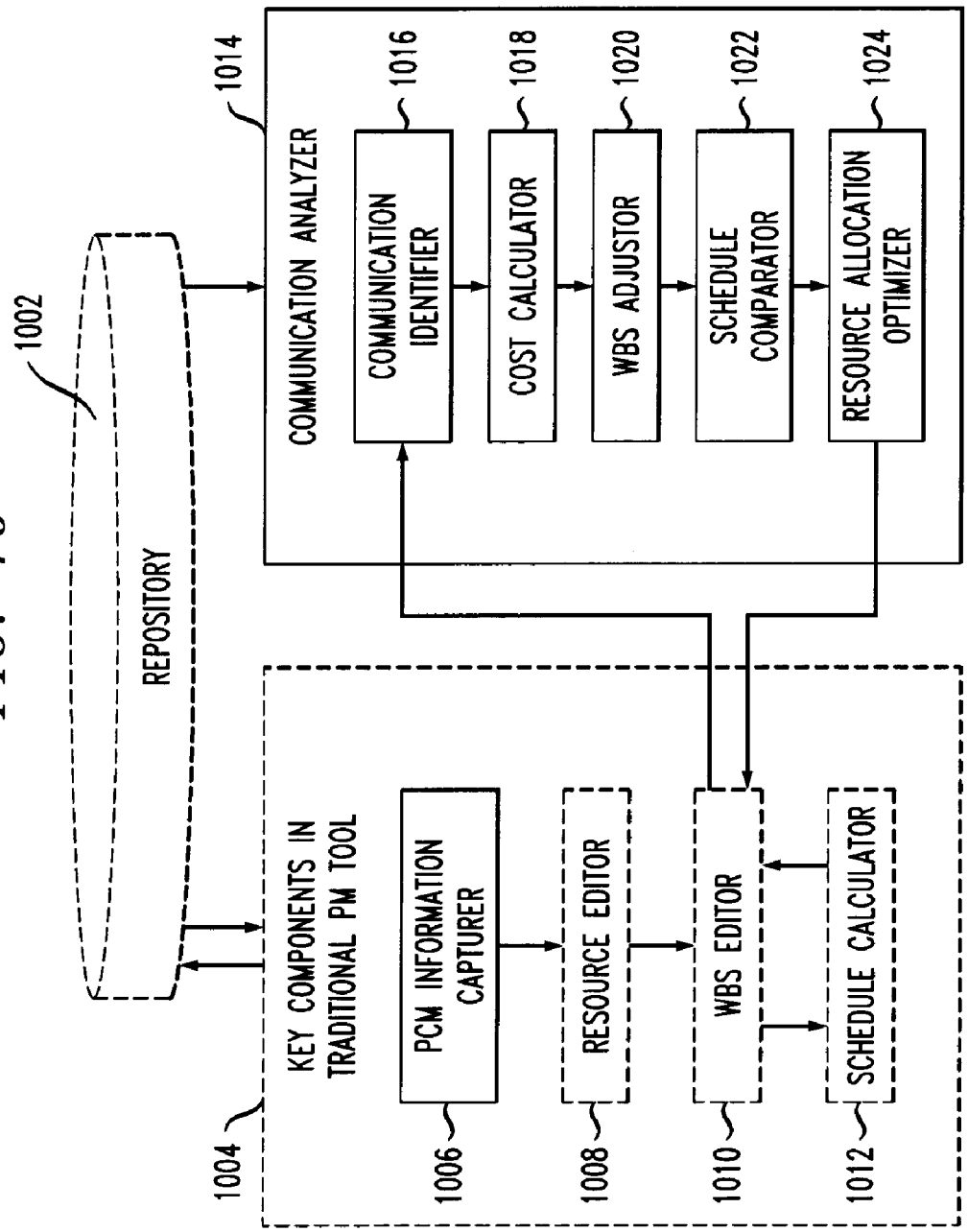
FIG. 10 is a block diagram illustrating an exemplary embodiment, according to an aspect of the invention.

FIG. 10 is a block diagram illustrating an exemplary embodiment, according to an aspect of the invention. By way of illustration, FIG. 10 depicts a repository 1002, a project management (PM) tool 1004, and a communication analyzer 1014. As depicted in FIG. 10, the PM tool 1004 includes a project communication model (PCM) information capturer module 1006, a resource editor module 1008, a work breakdown structure (WBS) editor module 1010 and a schedule calculator module 1012. Also, the communication analyzer 1014 includes a communication identifier module 1016, a cost calculator module 1018, a WBS adjustor module 1020, a schedule comparator module 1022 and a resource allocation optimizer module 1024.

As depicted in FIG. 10, dashed lines represent some components related to one or more embodiments of the invention in an existing project management tool modified by the techniques and components detailed herein. The resource editor module 1008 is used to input the information about the resources, such as name, role, skill, etc. The WBS editor module 1010 is used to decompose the project into the executable and measurable tasks. Accordingly, one or more embodiments of the invention can calculate the total schedule of the project based on the estimation of each task in the WBS. After allocating the resources to tasks, the schedule calculator module 1012 can generate the total schedule of the project (for example, critical path analysis can be used here). All of the information can be stored in repository 1002.

Further, in one or more embodiments of the invention, the communication analyzer 1014 can be implemented as a separate tool outside the project management tool 1004, and there are data exchanges between the two components to finish the communication cost analysis and optimize the resource allocation. Also, the communication analyzer 1014 can provide additional components to be plugged-in to the project management tool 1004.

Detailed information of developers, such as language, location, time zone and mobile employee etc., which affect the communication cost, can be recorded. Accordingly, one or more embodiments of the invention include component, referred to herein as the PCM information capturer module 1006, which extends the resource editor module 1008 to record such information. The PCM information capturer can open a user interface to allow the project manager to input the communication related information for each resource. The PCM information capturer can also connect with mail and/or calendar management software, such as IBM Lotus Notes, Google Calendar etc., to automatically extract related information therefrom. All of the information can be combined with the information from the resource editor module 1008 to be stored in the repository 1002.

After allocating the resources to the tasks in the WBS, the communication identifier module 1016 can identify the communications needed to be done among resources for this project. The resources will have a communication if they are taking the same task. The resources may need to communicate with each other to share knowledge, synchronize status or perform some decision making. If there are two tasks assigned to different resources and the two tasks have dependence with each other, the resources will need to have communications to discuss their collaboration. In some cases, a task depending on another task indicates that the former task cannot start before the latter task has finished. This dependence is referred to as finish-to-start (FS). Therefore, a synchronization communication may be needed when the latter task is going to end. One or more embodiments of the invention also include considering all the four types existing between two tasks: finish-to-start (FS), start-to-start (SS), finish-to-finish (FF), and start-to-finish (SF).

By way of example, SS means that the second task can only start after the first task starts. Therefore, a synchronization communication may exist when the first task starts. The types of dependencies can be considered in the WBS adjustment based on the communication cost calculation. The communication identifier module 1016 helps the project manager to identify the key communication based on the WBS. In one or more embodiments of the invention, the communication identifier module can allow the project manager to customize the communication needs. For example, the project manager can cancel the communication identified automatically or add additional communications that are needed.

After the communication needs identified, the cost calculator module 1018 can help to calculate the additional cost involved by the communication. One or more embodiments of the invention include using the sub-graph from the whole communication structure to quantify the cost of each communication. Other quantitative communication cost measurement techniques, for example, can also be used in connection with the cost calculator module.

A reason for considering the communication overhead is that it has impact on the project schedule, but not all the communication cost will have similar impact. For the communications that happen due to different resources working on the same task, one or more embodiments of the invention include considering whether the additional cost will delay the task schedule. For example, assume that five working days are allowed to finish a task. The resources originally plan to have a communication on the first working day, but the communication is delayed or prolonged to the second working day due to the global software development. It is possible that the task schedule is not impacted. But if the communication is delayed beyond the five working days, the schedule will be impacted. Accordingly, in one or more embodiments of the invention, a WBS adjustor module 1020 can automatically create a new task (for example, named Communication Task) to represent the communication delay, and the new task can have FF dependence with the original task. If the communications happen due to different resources working on the two tasks having dependence with each other, one or more embodiments of the invention include using FS to analyze the impact. In one or more additional embodiments of the invention, the other three types of dependencies can be considered similarly.

If the communication cannot be completed on time, one or more embodiments of the invention can also create a new task to represent the delay. As such, an FS dependence would be added between the first task to the new task and an FS dependence would be added between the new task and the second task. When allowing the lag time in the project schedule, the new task will have the duration with the delay minus the lag time. When we allow the lead time, the second task can begin before the first task is finished. Therefore, part of the second task can be executed in parallel with the first task, followed by the new task. Subsequently, the rest of the second task would finish. Based on the adjustment above, there will be a new WBS considering the impact of the communication cost to the project schedule.

In one or more embodiments of the invention, the function of schedule comparator module 1022 includes highlighting the project schedule delay due to the additional communication cost introduced by the global software development. Schedule comparator module 1022 can re-do the critical path analysis to calculate the whole project schedule, and in one or more embodiments of the invention, the schedule comparator can also invoke the schedule calculator module 1012 in the project management tool to get the new project schedule. Also, the schedule comparator performs the comparison between the new critical paths and the original ones, and finds the communication tasks appearing in the new critical paths and having impact on the project schedule. Those communication tasks can be the target to perform the optimization work.

By way of example, consider a scenario where a communication task is found in the critical path impacting the project schedule because the participants in the communication are located in the different time zones, so that the availability of the communication cannot be guaranteed. To solve this problem, a trip can be planned for some of the participants to reduce time zone difference when performing the tasks which generate such communications. Another solution can be, for example, to include more resources to avoid this communication with long distance. Also, resource allocation optimizer module 1024 can report the communications that need to be considered in the critical paths to the WBS editor module 1010 in the project management tool, as well as related optimization suggestions. The WBS editor module 1010 can also show this to the project manager for decision making purposes.

Figure 11:
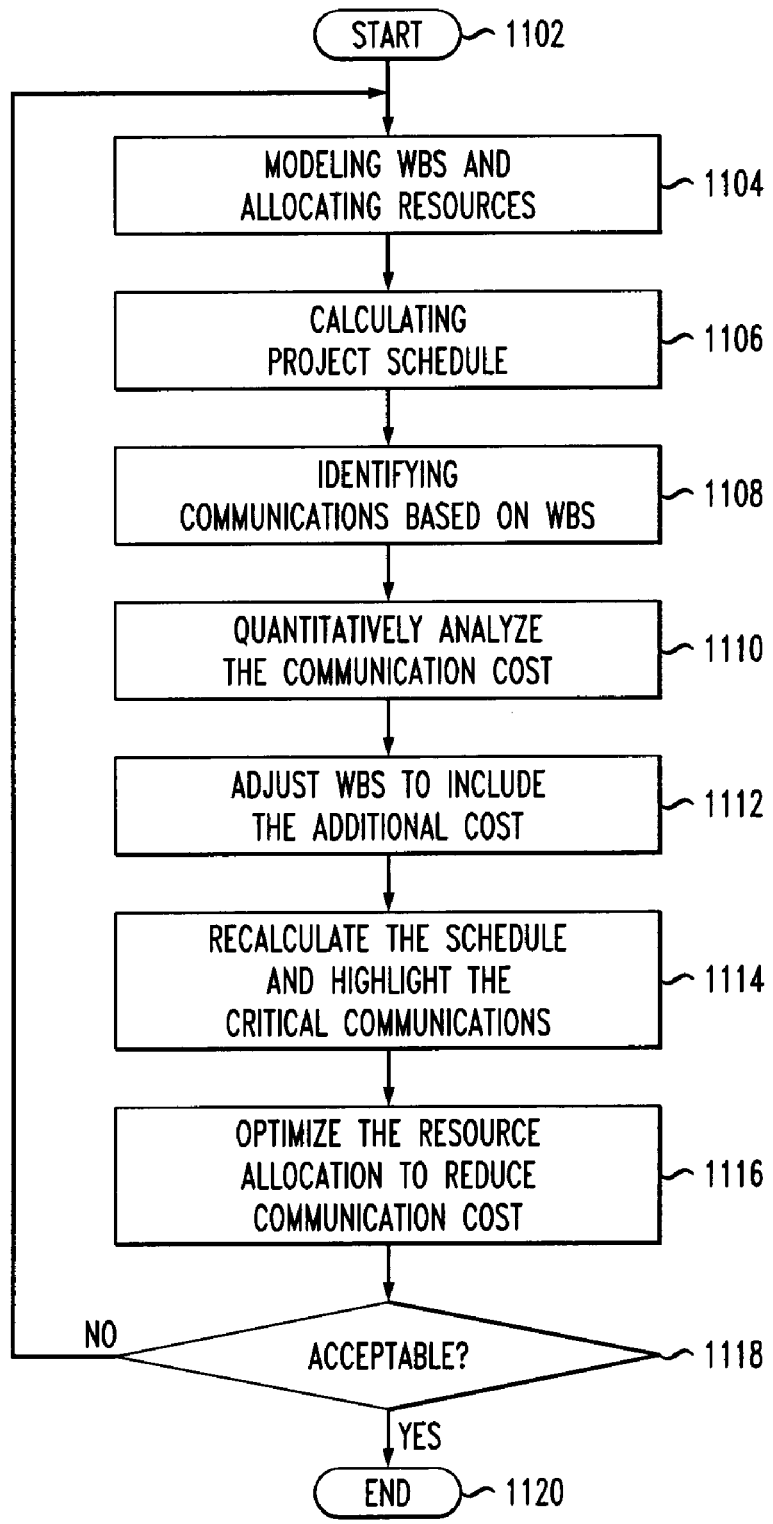
FIG. 11 is a flow diagram illustrating techniques for determining an optimization of resource allocation, according to an embodiment of the present invention.

FIG. 11 is a flow diagram illustrating techniques for determining an optimization of resource allocation, according to an embodiment of the present invention. Step 1102 includes starting the process. Step 1104 includes modeling a WBS and allocating resources. Step 1106 includes calculating a project schedule. Step 1108 includes identifying communications based on the WBS. Step 1110 includes quantitatively analyzing the communication cost. Step 1112 includes adjusting the WBS to include the additional cost. Step 1114 includes recalculating the schedule and highlighting the critical communications. Step 1116 includes optimizing the resource allocation to reduce communication cost. Step 1118 includes determining whether the optimization is acceptable. If no, return to step 1104. If yes, proceed to step 1120, which includes ending the process.

Figure 12:
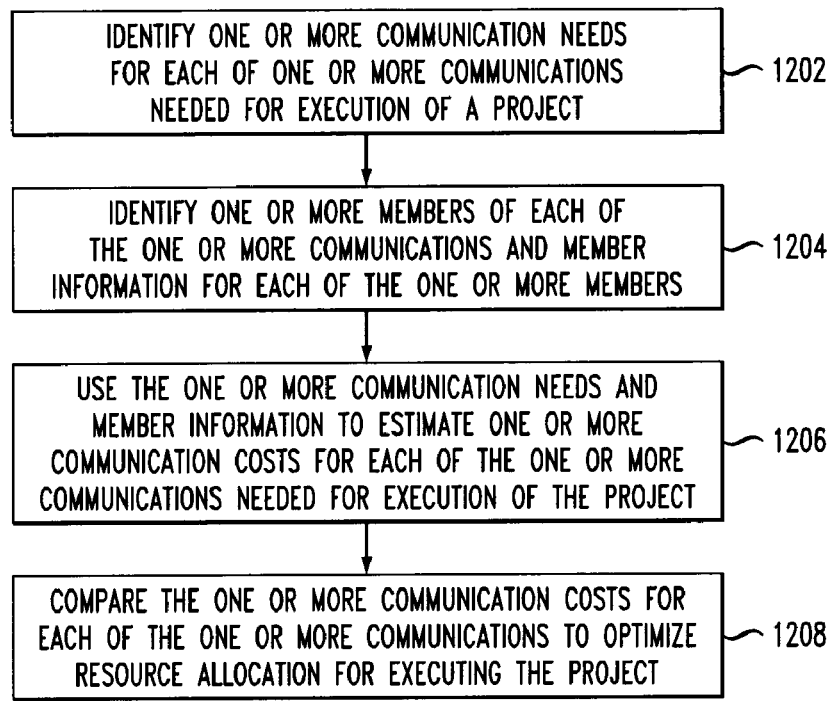
FIG. 12 is a flow diagram illustrating techniques for optimizing resource allocation, according to an embodiment of the invention.

FIG. 12 is a flow diagram illustrating techniques for optimizing resource allocation, according to an embodiment of the present invention. Step 1202 includes identifying one or more communication needs for each of one or more communications needed for execution of a project. This step can be carried out, for example, using a communication identifier module. Identifying communication needs for each communication needed for execution of a project can include identifying each communication need of the project as a communication type in project execution.

Also, identifying communication needs for each communication needed for execution of a project can include identifying a communication channel for each communication type. Identifying the communication channel for each communication type includes identifying the communication as a face to face meeting, a telephone call with presentation, a telephone call without presentation, an instant messaging communication, etc.

Further, identifying communication needs for each communication needed for execution of a project can include defining each project member as a hierarchical structure (for example, a graph), and identifying the communication needs from the hierarchical structure.

Step 1204 includes identifying one or more members of each of the one or more communications and member information for each of the one or more members. This step can be carried out, for example, using a PCM information capturer module and a communication identifier module. The information capturer module can be an extended component in the project management tool to capture the communication-related information of resources in the project. Such information can include, for example, communication language, skill of mastering the language for each team member, knowledge of a context of the communication, etc. The communication identifier module identifies the communication needs as well as the resource members involved in the communications.

Step 1206 includes using the one or more communication needs and member information to estimate one or more communication costs for each of the one or more communications needed for execution of the project. This step can be carried out, for example, using a cost calculator module. Estimating a communication cost for each communication needed for execution of the project includes estimating a delay of communication due to one or more time zone differences. Estimating a delay of communication due to time zone differences can include collecting time zone information from each participant, identifying each participant of the communication as optional or mandatory to the communication, collecting a schedule (for example, a calendar) history of each participant, using the collected and identified information to calculate the possible delay of a communication, and estimating an impact of project performance resulting from the possible delay.

Additionally, estimating communication costs for each of the communications needed for execution of the project can include facilitating use of a user interface for a project manager (and/or team leader) to define a duration and frequency of a communication, and facilitating use of a user interface for a project manager (and/or team leader) to specify at least one of a language used for the communication, a skill of master language, and a level of domain knowledge for each participant of the communication.

Step 1208 includes comparing the one or more communication costs for each of the one or more communications to optimize resource allocation for executing the project. This step can be carried out, for example, using a WBS adjustor module, a schedule comparator module, and a resource allocation optimizer module. The WBS adjustor module adjusts the WBS to include the communication overhead calculated by cost calculator module based on current team structures. The schedule comparator module re-calculates the project schedule by re-doing the critical path analysis to determine the impact to the original schedule. Also, the resource allocation optimizer module analyzes the different team structures. Comparing different team structures of the members can include generating two or more different team formations, estimating a cost of project execution considering communication overhead of each team formation and determining an optimal team formation based on the communication overhead.

The techniques depicted in FIG. 12 can also include storing resource allocation optimization information (for example, a particular team formation) into a repository for future usage.

The techniques depicted in FIG. 12 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In one or more embodiments, the modules include a communication analyzer module, a PCM information capturer module, a communication identifier module, a cost calculator module, a WBS adjuster module, a schedule comparator module and a resource allocation optimizer module that can run, for example on one or more hardware processors. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Additionally, the techniques depicted in FIG. 12 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 13:
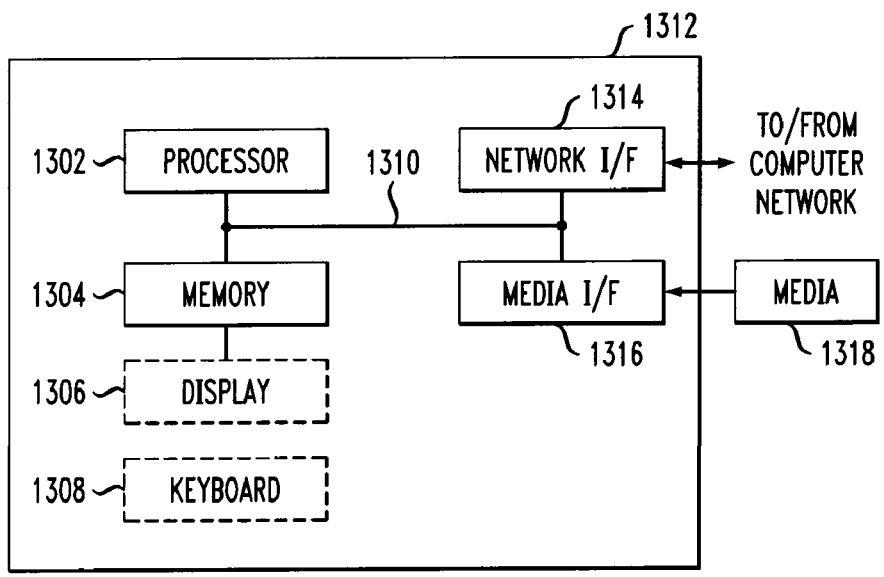
FIG. 13 is a system diagram of an exemplary computer system on which at least one embodiment of the invention can be implemented.

One or more embodiments can make use of software running on a general purpose computer or workstation. With reference to FIG. 13, such an implementation might employ, for example, a processor 1302, a memory 1304, and an input/output interface formed, for example, by a display 1306 and a keyboard 1308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1302, memory 1304, and input/output interface such as display 1306 and keyboard 1308 can be interconnected, for example, via bus 1310 as part of a data processing unit 1312. Suitable interconnections, for example via bus 1310, can also be provided to a network interface 1314, such as a network card, which can be provided to interface with a computer network, and to a media interface 1316, such as a diskette or CD-ROM drive, which can be provided to interface with media 1318.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1302 coupled directly or indirectly to memory elements 1304 through a system bus 1310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1308, displays 1306, pointing devices, and the like) can be coupled to the system either directly (such as via bus 1310) or through intervening I/O controllers (omitted for clarity).

Network adapters such as network interface 1314 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1312 as shown in FIG. 13) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 1318 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 10. The method steps can then be carried out using the distinct software modules and/or sub-modules of the system, as described above, executing on one or more hardware processors 1302. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, providing techniques to categorize the communication among global teams in terms of its purpose, quantitatively analyze the overhead of each kind of communication based on its properties, and optimize the structure of global teams and the allocation of tasks.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for optimizing resource allocation, wherein the method comprises:
identifying one or more communication needs for each of one or more communications needed for execution of a global service project, wherein the one or more communication needs comprise communication frequency, skill level requirement and language requirement, said identifying carried out via a distinct software module executing on a hardware processor;
identifying one or more members of each of the one or more communications and member information for each of the one or more members, wherein the member information comprises physical location of the member, member skill level and language capabilities of the member, said identifying carried out via a distinct software module executing on a hardware processor;
using the one or more communication needs and member information to estimate one or more communication costs for each of the one or more communications needed for execution of the global service project, said using carried out via a distinct software module executing on a hardware processor, and wherein said estimating comprises solving $C_t = \lambda C_p$, wherein:
$C_t$ is communication cost wherein members are in different time zones;
$\lambda$ is a combined cost factor and expressed as $$\lambda = \frac{1}{\alpha}\left(\sum_{i=1}^{m} \frac{\xi_i}{\omega_i}\right) \geq 1,$$

wherein $\alpha$ is a parameter reflecting channel capacity reduction, m is a number of members in a communication, $\xi_i$ is a percentage of information contributed by member i, and $\omega$ is a coefficient representing member information; and
$C_p$ is expressed as $$\frac{I}{\gamma I_u},$$

wherein I is a total amount of information in a communication, $I_u$, is transmitted information per time unit, and $\gamma$ is a coefficient discounting unit transferred information;
comparing the one or more communication costs for each of the one or more communications to determine a resource allocation for executing the global service project that is lowest in terms of cost of the project and/or execution time of the project, wherein resource allocation comprises member staffing and communication scheduling, said comparing carried out via a distinct software module executing on a hardware processor; and
allocating resources for execution of the global service project in accordance with the resource allocation derived from said comparing, said allocating carried out via a distinct software module executing on a hardware processor.

2. The method of claim 1, further comprising storing resource allocation optimization information into a repository.

3. The method of claim 1, wherein identifying one or more communication needs for each of one or more communications needed for execution of a project comprises identifying each communication need of the project as a communication type in project execution.

4. The method of claim 1, wherein identifying one or more communication needs for each of one or more communications needed for execution of a project comprises identifying a communication channel for each communication type.

5. The method of claim 4, wherein identifying the communication channel for each communication type comprises identifying the communication as at least one of a synchronous communication including a face to face meeting, a telephone call with presentation, a telephone call without presentation, an instant messaging communication, and/or an asynchronous communication such as e-mail or voice mail.

6. The method of claim 1, wherein member information comprises at least one of communication language, time zone difference, holiday difference, skill of mastering the language for each team member, and knowledge of a context of the communication.

7. The method of claim 1, wherein estimating a communication cost for each of the one or more communications needed for execution of the project comprises estimating a delay of communication due to one or more time zone differences and/or holiday differences.

8. The method of claim 7, wherein estimating a delay of communication due to one or more time zone differences and/or holiday differences comprises:
    collecting time zone information from each member;
    identifying each member of the communication;
    collecting a schedule history of each member based on calendar entries;
    using the collected and identified information to calculate the possible delay of a communication; and
    estimating an impact on project performance resulting from the possible delay.

9. The method of claim 1, wherein the one or more communication costs for each of the one or more communications are based on a comparison of two or more different team structures of the one or more members.

10. The method of claim 9, wherein comparing two or more different team structures of the one or more members comprises:
    generating two or more different team formations;
    estimating a cost of project execution considering communication overhead of each team formation; and
    determining the team formation having the lowest communication overhead.

11. The method of claim 1, wherein identifying one or more communication needs for each of one or more communications needed for execution of a project comprises:
    defining each project member as a hierarchical structure; and
    identifying the one or more communication needs from the hierarchical structure.

12. The method of claim 1, wherein estimating one or more communication costs for each of the one or more communications needed for execution of the project comprises:
    facilitating use of a user interface for a project manager to define a duration and frequency of a communication; and
    facilitating use of a user interface for a project manager to specify at least one of a language used for the communication, a skill of master language, and a level of domain knowledge for each member of the communication.

13. A computer program product comprising a tangible computer readable recordable storage medium including computer useable program code for optimizing resource allocation, the computer program product including:
    computer useable program code for identifying one or more communication needs for each of one or more communications needed for execution of a global service project, wherein the one or more communication needs comprise communication frequency, skill level requirement and language requirement;
    computer useable program code for identifying one or more members of each of the one or more communications and member information for each of the one or more members, wherein the member information comprises physical location of the member, member skill level and language capabilities of the member;
    computer useable program code for using the one or more communication needs and member information to estimate one or more communication costs for each of the one or more communications needed for execution of the global service project, wherein said estimating comprises solving $C_t = \lambda C_p$, wherein:
        $C_t$ is communication cost wherein members are in different time zones;
        $\lambda$ is a combined cost factor and expressed as $$\lambda = \frac{1}{\alpha}\left(\sum_{i=1}^{m} \frac{\xi_i}{\omega_i}\right) \geq 1,$$

wherein $\alpha$ is a parameter reflecting channel capacity reduction, m is a number of members in a communication, $\xi_i$ is a percentage of information contributed by member i, and $\omega$ is a coefficient representing member information; and
        $C_p$ is expressed as $$\frac{I}{y I_u},$$

wherein I is a total amount of information in a communication, $I_u$ is transmitted information per time unit, and y is a coefficient discounting unit transferred information;
    computer useable program code for comparing the one or more communication costs for each of the one or more communications to determine a resource allocation for executing the global service project that is lowest in terms of cost of the project and/or execution time of the project, wherein resource allocation comprises member staffing and communication scheduling; and
    computer useable program code for allocating resources for execution of the global service project in accordance with an optimized resource allocation derived from said comparing.

14. The computer program product of claim 13, wherein member information comprises at least one of communication language, time zone difference, holiday difference, skill of mastering the language for each team member, and knowledge of a context of the communication.

15. The computer program product of claim 13, wherein the computer useable program code for estimating a communication cost for each of the one or more communications needed for execution of the project comprises computer useable program code for estimating a delay of communication due to one or more time zone differences and/or holiday differences.

16. The computer program product of claim 13, further comprising computer useable program code for comparing two or more different team structures of the one or more members, wherein the computer useable program code for comparing two or more different team structures of the one or more members further comprises:
    computer useable program code for generating two or more different team formations;

computer useable program code for estimating a cost of project execution considering communication overhead of each team formation; and computer useable program code for determining the team formation having the lowest communication overhead.

17. A system for optimizing resource allocation, comprising:
a memory; and
at least one processor coupled to the memory and operative to:
identify one or more communication needs for each of one or more communications needed for execution of a global service project, wherein the one or more communication needs comprise communication frequency, skill level requirement and language requirement;
identify one or more members of each of the one or more communications and member information for each of the one or more members, wherein the member information comprises physical location of the member, member skill level and language capabilities of the member;
use the one or more communication needs and member information to estimate one or more communication costs for each of the one or more communications needed for execution of the global service project, and wherein said estimating comprises solving $C_t = \lambda C_p$, wherein:
$C_t$ is communication cost wherein members are in different time zones;
$\lambda$ is a combined cost factor and expressed as $$\lambda = \frac{1}{\alpha}\left(\sum_{i=1}^{m} \frac{\xi_i}{\omega_i}\right) \geq 1,$$

wherein $\alpha$ is a parameter reflecting channel capacity reduction, m is a number of members in a communication, $\xi_i$ is a percentage of information contributed by member i, and $\omega$ is a coefficient representing member information; and
$C_p$ is expressed as $$\frac{I}{y I_u},$$

wherein I is a total amount of information in a communication, $I_u$ is transmitted information per time unit, and y is a coefficient discounting unit transferred information;
compare the one or more communication costs for each of the one or more communications to determine a resource allocation for executing the global service project that is lowest in terms of cost of the project and/or execution time of the project, wherein resource allocation comprises member staffing and communication scheduling; and
allocate resources for execution of the global service project in accordance with an optimized resource allocation derived from said comparing.

18. The system of claim 17, wherein the at least one processor coupled to the memory operative to estimate a communication cost for each of the one or more communications needed for execution of the project is further operative to estimate a delay of communication due to one or more time zone differences and/or holiday differences.

19. The system of claim 17, wherein the at least one processor coupled to the memory is further operative to compare two or more different team structures of the one or more members, and wherein the at least one processor coupled to the memory operative to compare two or more different team structures of the one or more members is further operative to:
generate two or more different team formations;
estimate a cost of project execution considering communication overhead of each team formation; and
determine the team formation having the lowest communication overhead.

* * * * *